United States Patent [19]

Kearney

[11] Patent Number: 4,577,470

[45] Date of Patent: Mar. 25, 1986

[54] AIR COOLER ADAPTOR

[75] Inventor: Anthony D. Kearney, St. Marys, Australia

[73] Assignee: F. F. Seeley Nominees Pty Ltd, St. Marys, Australia

[21] Appl. No.: 667,650

[22] Filed: Nov. 2, 1984

[30] Foreign Application Priority Data

Nov. 4, 1983 [AU] Australia .............................. PG2219

[51] Int. Cl.$^4$ ............................................ F25D 23/12
[52] U.S. Cl. .................................... 62/259.4; 62/298; 165/80.1

[58] Field of Search .................... 62/304, 259.1, 259.4, 62/298; 261/DIG. 15, DIG. 41; 98/105, 109; 126/113; 165/80 R, 76, 79

Primary Examiner—Henry Bennett
Attorney, Agent, or Firm—Henry Sternberg; Bert J. Lewen

[57] ABSTRACT

An adaptor which is positionable within the base of an air cooler and which has L-section flanges extending outwardly and depending therefrom which locate the adaptor with respect to a supporting duct work, the adaptor having retention barbs which snap into and engage surfaces of an air cooler to retain the adaptor in position.

8 Claims, 3 Drawing Figures

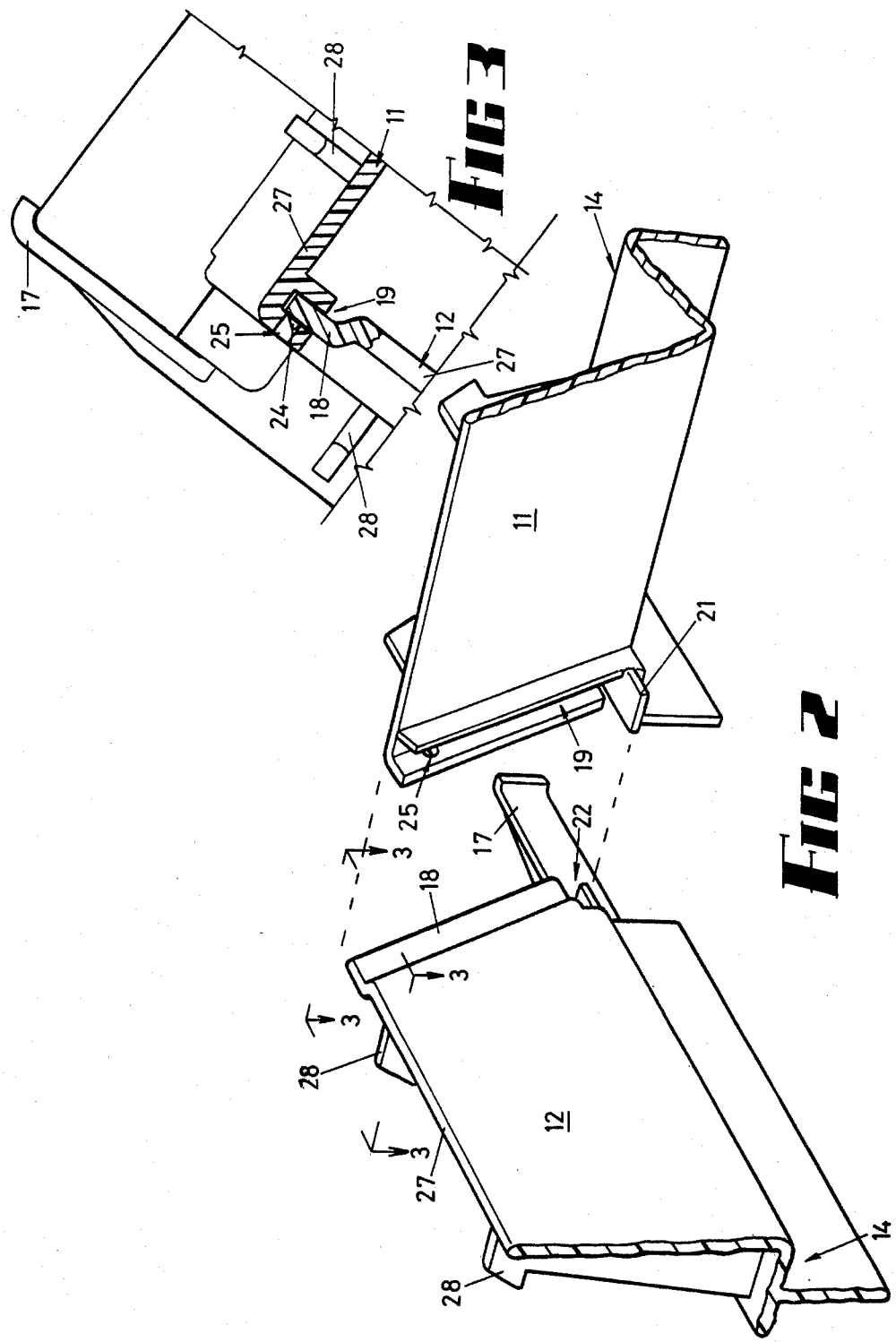

AIR COOLER ADAPTOR

This invention relates to an air cooler adaptor which is useful for supporting an air cooler of the type having walls extending upwardly from a base and defining a cool air outlet, by the upper end of ducting. Such an air cooler is described in some detail in our co-pending Australian Patent Application No. PG 2041 dated the 25th day of October, 1983 which corresponds to U.S. patent application Ser. No. 663,772 filed Oct. 23, 1984.

BACKGROUND OF THE INVENTION

Airconditioning ducting is available in standard sizes, and it is desirable that an air cooler should be positionable on and supported by the upper end of a length of standard size airconditioning ducting. It will be appreciated that quite often the fitting is in an elevated position and sometimes in the space between a roof and ceiling, and it is most desirable that fitting operation should be as simple as possible. Furthermore, when an evaporative air cooler is used of the type described in the said Application PG2041, the cooling water is turbulent and there is an inherent danger of malfunction which may result in water being released from the base of the airconditioner. It is important that such water should not enter the duct where it can cause excessive humidity, interfere with the efficiency of thermal insulation, and/or possibly result in the development of an objectionable odour.

BRIEF SUMMARY OF THE INVENTION

Briefly in this invention there is provided an adaptor which is positionable within the base of an air cooler and which has L-section flanges extending outwardly and depending therefrom which locate the adaptor with respect to a supporting duct work, the adaptor having retention barbs which snap into and engage surfaces of an air cooler to retain the adaptor in position.

With this arrangement, it is merely necessary to snap the adaptor into position into the base of an air cooler, and the air cooler can then be located over and supported by the upper end of a length of standard duct work. It can then be simply secured with standard screw fasteners.

More specifically, the invention consists of an air cooler adaptor for supporting an air cooler of the type having walls extending upwardly from a base and within the cooler perimeter defining a cool air outlet, comprising a plurality of panels, each of some at least of said panels terminating along its lower edge in an outwardly and downwardly extending L-shaped flange, each of some at least of said panels having outwardly projecting barbs, the sizes and shapes of said L-shaped flanges and said barbs being such that, when the adaptor supports an air cooler from the upper end of ducting, said flanges overlie said ducting upper end and said barbs interengage the cooler air outlet walls.

It is of course desirable that transporting and packaging of an adaptor in this invention should be as simple as possible, and it will be appreciated that the adaptor is necessarily rather bulky in its assembled state. With the object of providing improvements in this area in one aspect of this invention the adaptor comprises four adaptor panels having interengaging ends, arranged so that when interengaged they form a sub-assembly which is retained as a sub-assembly upon positioning within the lower part of an air cooler.

BRIEF DESCRIPTION OF THE DRAWINGS

An embodiment of the invention is described hereunder in some detail with reference to, and is illustrated in, the accompanying drawings, in which FIG. 2 is an "exploded" view showing interconnecting ends of the adaptor panels, and FIG. 3 is a fragmentary section on plane 3—3—3—3 of FIG. 2, but showing an assembled condition.

Figure 1:
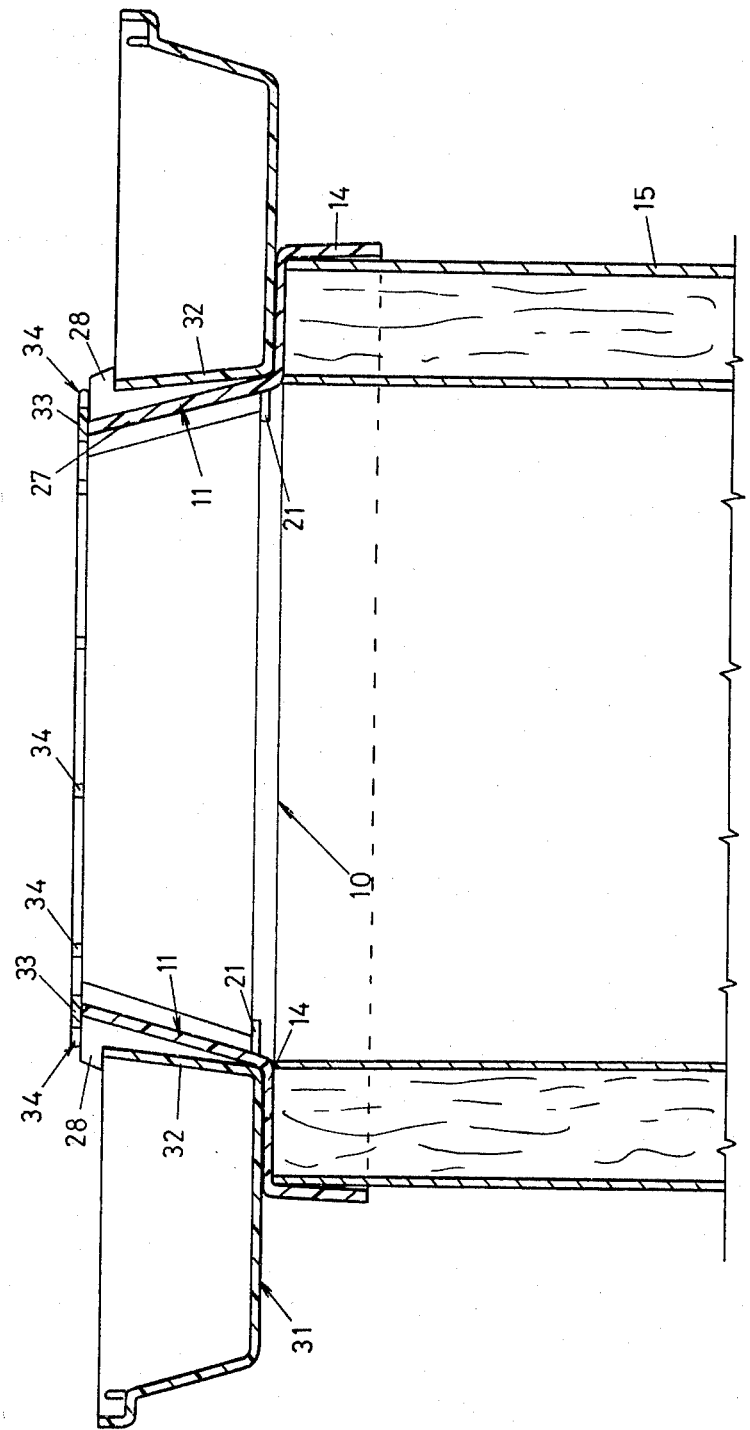
FIG. 1 is an elevational section, showing the arrangement of the adaptor supporting the base tank of an evaporative type air cooler by the upper end of an air duct.

In this embodiment an adaptor 10 comprises two identical side panels 11 which interengage ends of two identical end panels 12. Each panel comprises an L-section flange 14 which extends outwardly and downwardly so as to overlie the outer surface of a standard section duct 15, and to surround its upper end.

Each of the two end panels 12 has extending fingers 17 which engage over ends of the other two side panels 11, and there are also projecting tongues 18 on each of two opposite end panels 12 and complementary grooves in each of the two side panels 11 which receive respective said tongues 18 to thereby comprise a tongue and groove interengagement upon assembly which locates the ends of the panels with respect to one another. Further interengagement is achieved by laterally outstanding lugs 21 on the side panels 11 which engage grooves 22 in the end panels 12. Still further, as shown in FIG. 3, wedge shaped projections 24 outstanding from respective tongues 18 of end panels 4 interengage the surface of respective apertures 25 in the ends of side panels 11 upon assembly of the panels, and effectively restrain disengagement.

Each adaptor panel also has an upwardly but inwardly sloping web 27, and a plurality of barbs 28 project outwardly from each web 27.

The base 31 of the air cooler comprises four walls 32 which slope upwardly and inwardly and define a cool air outlet, but are more nearly vertical than the walls 27, as seen in FIG. 1. Each wall 32 terminates at its upper end in an inwardly directed flange 33 against which the upper edge of a respective barb 28 abuts. The barbs 28 extend through respective apertures 34 in walls 32, and the barbs also space the upper ends of panels 11 and 12 inwardly from walls 32, so that water (if any) which flows through apertures 34 is shed over the outer surfaces of walls 11 and 12, and will not enter the duct. Since apertures 34 are in the side walls near their upper edges, and the arrangement is such that when the sub-assembly of the air cooler adaptor is pushed upwardly, there is a resilient deformation of the adaptor side panels and the barbs 28 then snap back into position in the apertures 34 to engage surfaces defining those apertures and retain the adaptor in position with respect to the air cooler base, and at the same time interengagement of the ends of the adaptor panels is retained, since disengagement is associated with outward movement, this being constrained by the side walls of the air cooler base.

A consideration of the above embodiment will indicate that the invention is very simple. The interengagement is effected quickly and efficiently. Desirably all parts are formed from a polymeric material which requires very little attention even under wet conditions.

I claim:

1. An adaptor for supporting an air cooler, said air cooler being of the type having walls extending upwardly from a base and within the cooler perimeter for defining a cool air outlet, said adaptor comprising at least one pair of opposed, relatively fixed panels, each of said pair of panels terminating along its lower edge in an L-shaped flange extending outwardly and downwardly in a direction away from the other of said pair of panels, and each of said pair of panels having outwardly projecting barbs, the sizes and shapes of said L-shaped flanges and said barbs being such that, when the adaptor supports an air cooler from the upper end of ducting, said flanges overlie and surround said ducting upper end and said barbs engage the walls of said cool air outlet of said air cooler.

2. An adaptor according to claim 1 wherein each said panel comprises an upwardly and inwardly sloping wall, and said barbs extend outwardly from said panel walls, so arranged that, when the adaptor supports an air cooler, the barbs engage surfaces on the walls of said cool air outlet.

3. An adaptor according to claim 2 wherein each said panel slopes more than the outlet walls to which it is adjacent.

4. An adaptor according to claim 2 wherein each said panel terminates at its ends with interengaging surfaces which interengage adjacent ends of adjacent panels to form an assembly.

5. An adaptor according to claim 1 wherein said panels comprise side and end panels, the ends of each of the side panels have upwardly extending surfaces defining respective grooves, and the ends of each of the end panels comprise upwardly extending tongues engageable in respective grooves, and respective resilient fingers which engage over the ends of side panels.

6. An adaptor according to claim 5 wherein a said groove surface at each end of each of said side panels contains an aperture, and each said end panel tongue is provided with a wedge shaped projection which engages the wall of a respective said aperture upon assembly.

7. An adaptor according to claim 5 wherein each end of each said end panel has laterally extending surfaces defining a groove, and each end of each said side panel has a laterally extending lug engageable in a said laterally extending groove upon assembly.

8. An adaptor according to claim 1 further comprising a second pair of opposed panels cooperatively assembled with said first mentioned pair of panels to form a generally rectangular structure, said ducting upper end having a generally rectangular outline and said adaptor being of such dimension that the lower edges of said panels generally coincide with the inner edges of the duct upper end, said L-shaped flanges having a generally horizontal portion configurated to overlie the end face of the wall of said ducting upper end and to support thereon said air cooler, and said outwardly extending barbs engaging upwardly facing surfaces of said cool air outlet wall of said air cooler for detachably locking said adaptor to said air cooler.

* * * * *